US012222801B2

United States Patent
Madiya et al.

(10) Patent No.: US 12,222,801 B2
(45) Date of Patent: Feb. 11, 2025

(54) INTELLIGENT ISSUE IDENTIFIER FOR AUTO-DETECTING DYNAMIC ISSUE CHANGES IN A DISTRIBUTED NETWORK

(71) Applicant: Bank of America Corporation, Charlotte, NC (US)

(72) Inventors: Tirupathirao Madiya, Hyderabad (IN); Vishalakshi Nagasai Poosa, Hyderabad (IN); Yellaiah Ponnameni, Hyderabad (IN); Gourav Mohite, Gurugram (IN); Vinothkumar Babu, Chennai (IN)

(73) Assignee: Bank of America Corporation, Charlotte, NC (US)

( * ) Notice: Subject to any disclaimer, the term of this patent is extended or adjusted under 35 U.S.C. 154(b) by 22 days.

(21) Appl. No.: 18/163,791

(22) Filed: Feb. 2, 2023

(65) Prior Publication Data

US 2024/0264897 A1 Aug. 8, 2024

(51) Int. Cl.
*G06F 11/00* (2006.01)
*G06F 11/07* (2006.01)
*G06N 3/08* (2023.01)

(52) U.S. Cl.
CPC ...... *G06F 11/0793* (2013.01); *G06F 11/0709* (2013.01); *G06F 11/079* (2013.01); *G06N 3/08* (2013.01)

(58) Field of Classification Search
CPC ............. G06F 11/0793; G06F 11/0709; G06F 11/079; G06N 3/08
USPC ...................................................... 714/1–57
See application file for complete search history.

(56) References Cited

U.S. PATENT DOCUMENTS

| | | |
|---|---|---|
| 5,202,971 A | 4/1993 | Henson et al. |
| 9,959,118 B2 | 5/2018 | Bradbury et al. |
| 10,255,571 B2 | 4/2019 | Cantor et al. |
| 10,445,351 B2 | 10/2019 | Buryak et al. |
| 10,705,823 B2 | 7/2020 | Pitre et al. |
| 10,713,794 B1 | 7/2020 | He et al. |
| 10,834,577 B2 | 11/2020 | Raleigh et al. |
| 10,963,349 B2 | 3/2021 | Dhamdhere et al. |
| 10,999,381 B2 | 5/2021 | Xiao et al. |
| 11,039,489 B2 | 6/2021 | Serravalle |
| 11,115,466 B2 | 9/2021 | Basavaiah et al. |
| 11,232,417 B2 | 1/2022 | Klarman et al. |
| 11,330,447 B2 | 5/2022 | Lau |
| 11,469,947 B2 | 10/2022 | Srinivas et al. |

(Continued)

*Primary Examiner* — Sarai E Butler

(57) ABSTRACT

A system for auto-detecting dynamic issue changes in a distributed network comprises a processor associated with a server. The processor detects an application issue at a network node receives a first set of data objects associated with the application issue occurring at the first timestamp. The processor receives a second set of data objects associated with the application issue occurring at the second timestamp. The processor determines a change between a first set of the data objects and a second set of data objects. The processor identifies an issue pattern represents an operation change of the application by a machine learning model. The processor processes the issue pattern with application information through a neural network to determine a series of executable operations associated with the application issue. The processor deploys the series of the executable operations to solve the application issue to prevent a failure operation of the application.

20 Claims, 5 Drawing Sheets

(56) References Cited

U.S. PATENT DOCUMENTS

| | | | |
|---|---|---|---|
| 2002/0002448 A1* | 1/2002 | Kampe | G06F 11/008 |
| | | | 703/22 |
| 2009/0106603 A1* | 4/2009 | Dilman | G06F 11/327 |
| | | | 714/E11.002 |
| 2010/0083048 A1* | 4/2010 | Calinoiu | G06F 11/0787 |
| | | | 714/38.11 |
| 2010/0083055 A1* | 4/2010 | Ozonat | G06F 11/3447 |
| | | | 714/E11.179 |
| 2015/0220405 A1* | 8/2015 | Neef | G06F 11/1438 |
| | | | 714/15 |
| 2016/0314034 A1* | 10/2016 | Adinarayan | G06F 11/0751 |
| 2017/0139806 A1* | 5/2017 | Xu | G06F 11/3612 |
| 2018/0039548 A1* | 2/2018 | Bryant | G06F 11/0751 |
| 2019/0332481 A1* | 10/2019 | Kulick | G06F 11/076 |
| 2020/0092404 A1* | 3/2020 | Wagmann | H04L 69/40 |
| 2020/0349047 A1* | 11/2020 | Faibish | G06N 3/08 |
| 2020/0409831 A1* | 12/2020 | Balasubramanian | |
| | | | G06F 11/3688 |
| 2021/0258377 A1 | 8/2021 | Arthursson | |
| 2021/0272568 A1 | 9/2021 | Akkiraju et al. | |
| 2022/0038353 A1 | 2/2022 | Yadav et al. | |
| 2022/0066906 A1* | 3/2022 | Kumar | G06F 11/302 |
| 2022/0179763 A1* | 6/2022 | Chan | G06F 11/3006 |

\* cited by examiner

INTELLIGENT ISSUE IDENTIFIER FOR AUTO-DETECTING DYNAMIC ISSUE CHANGES IN A DISTRIBUTED NETWORK

TECHNICAL FIELD

The present disclosure relates generally to software engineering and information security, and more specifically to a system and method for auto-detecting dynamic issue changes in a distributed network.

BACKGROUND

An organization may have thousands of network nodes (e.g., computing devices) which communicate with each other in a distributed network. The organization depends on data driven technologies with applications running on various platforms like on-premise servers, databases, cloud networks, etc. A great amount of dynamic issues, such as data processing, application configuration, and memory utilization issues associated with applications and network nodes may occur in the distributed network. Customer centric services and ceaseless support are required to provide evident solutions to these ever-changing issues. Current technologies are not configured to provide a reliable and efficient solution to automatically detecting and solving these dynamic issues in the distributed network without human administrator intervention.

SUMMARY

Conventional technology is not configured to provide reliable and efficient solutions to automatically detecting and solving dynamic issues or problems occurring in a distributed network. The disclosed system described in the present disclosure is particularly integrated into a practical application of auto-detecting dynamic issues and auto-determining solutions to solve these dynamic issues in the distributed network. The disclosed system is further integrated into an additional practical application of auto-detecting dynamic issue changes to solve dynamic issues in the distributed network. The disclosed system is further integrated into an additional practical application of implementing auto-correction to solve dynamic issues in the distributed network.

In a current distributed network environment, an organization may have thousands of network nodes (e.g., computing devices) which communicate with each other through a network in a distributed network environment. Each network node may be represented as a computing device in the distributed network. Each network node may be a user device or a server. Status of the applications associated with the network nodes may dynamically change in response to various situations in the distributed network. Since various technical issues associated with the network nodes may constantly change, customer support may receive a plurality of service requests regarding various technical issues occurring at the network nodes in the distributed network at any time. For example, an application may not operate well in lack of memory space at a network node. In another example, a processor power consumption associated with a network node may need to be reduced to keep a normal operation status. In another example, an application configuration may need to be adjusted to allow a user to access certain data resources in the distributed network. Administrators may not be able to provide solutions to solve these ever-changing problems and provide timely support. The disclosed system addresses these issues by automatically detecting dynamic application issues, and determining and deploying solutions with executable operations to solve these issues in the distributed network in real time.

In some embodiments, the disclosed system automatically detects and analyzes application status associated with an application running at a network node. The application status may be presented as a plurality of data objects and stored in a database. The system detects a dynamic issue associated with the application running on the network node. The dynamic issue may be an application issue associated with a software application or a hardware application associated with a device operating at the network node.

In some embodiments, the disclosed system is configured to auto-determine solutions to solve a dynamic issue occurring at the network node in the distributed network. The system uses a machine learning model to analyze the plurality of the data objects associated with an application issue and identifies one or more issue patterns for the application issue. The system further uses a neural network to process the one or more issue patterns and the application information to determine a strategic solution with a series of executable operations. The series of the executable operations is configured to solve the application issue at the network node. The system automatically deploys the series of the executable operations to seamlessly solve the application issue to prevent a failure operation of the application at the network node.

In some embodiments, the disclosed system is configured to auto-detect dynamic issue changes to solve a dynamic issue in a distributed network. For example, the system detects an application issue associated with an application by identifying operation changes between different application status of the application. Different application status may be represented as different sets of data objects at various timestamps. The system determines the changes between different sets of data objects as operation changes of the application issue. The system uses a machine learning model to analyze the changes of the different sets of data objects between different timestamps. The system uses the machine learning model to identify an issue pattern associated with the operation changes of the application issue. The issue patent represents the operation changes of the application issue which occurs between different timestamps. The system further uses a neural network to process the issue pattern and the application information to determine a strategic solution with a series of executable operations. The series of the executable operations is indicative of the strategic solution of the application issue and corresponds to the operation changes of the application issue. The series of the executable operations is configured to solve the application issue at the network node. The system automatically deploys the series of the executable operations to seamlessly solve the application issue to prevent a failure operation of the application at the network node.

In some embodiments, the disclosed system is configured to implement auto-correction to solve dynamic issues in a distributed network. For example, the system detects an application issue associated with an application running at a network node at a particular timestamp. The application issue includes a user request with an issue statement and a user interaction associated with one or more operation parameters of the application. The application issue may be presented as a plurality of data objects at a timestamp. The system uses a machine learning model to analyze the plurality of the data objects and identifies one or more issue patterns associated with the application issue. The system further uses a neural network to process the issue pattern and the application information to determine a strategic solution with a series of executable operations. The series of the executable operations is configured to solve the application issue at the network node. The series of executable operations includes a network node address and an application identifier. When the system determines that the network node is communicating with the processor and the application is currently running at the network node, the system automatically deploys the series of the executable operations to correct the one or more parameters of the application running at the network node to prevent a failure operation of the application.

In one embodiment, a system for auto-determining solutions for dynamic issues in a distributed network comprises a memory and a processor operably coupled to the memory. The memory is operable to store a plurality of sets of previous data objects associated with corresponding previous application issues and issue patterns associated with corresponding applications. Each data object represents an operation status of a corresponding application. Each issue pattern represents a regularity of the operation status of the corresponding application. The memory is operable to store the plurality of series of executable operations for solving the previous application issues. The processor detects an application issue associated with an application running at a network node at a particular timestamp. The processor receives a set of data objects associated with the application issue. The processor classifies, by a machine learning model, the set of the data objects of the application issue into one or more issue patterns. The machine learning model is trained based on the plurality of sets of the data objects and corresponding issue patterns associated with the corresponding previous application issues. The processor processes, through a neural network, the one or more issue patterns and application information associated with the application issue at the network node to determine a series of executable operations for solving the application issue. The neural network is trained based on the plurality of the issue patterns and associations between the issue patterns and the plurality of series of the executable operations. The processor deploys the series of the executable operations to solve the application issue at the network node to prevent a failure operation of the application.

In one embodiment, a system for auto-detecting dynamic issue changes in a distributed network comprises a memory and a processor operably coupled to the memory. The memory is operable to store a plurality of sets of previous data objects associated with corresponding previous application issues and issue patterns associated with corresponding applications. Each data object represents an operation status of a corresponding application. Each issue pattern represents one or more recurring operation status of the corresponding application. The memory is further operable to store a plurality of series of executable operations associated with the corresponding issue patterns configured to solve the previous application issues. The processor detects an application issue associated with an application running at a network node at a first timestamp. The processor receives a first set of data objects associated with the application issue occurring at the first timestamp. The processor detects the application issue associated with the application running at the network node at a second timestamp. The processor receives a second set of data objects associated with the application issue occurring at the second timestamp. The processor determines a change between a first set of the data objects and a second set of data objects. The processor identifies, by a machine learning model and based on the change between the first set of the data objects and the second set of data objects. An issue pattern represents an operation change of the application which occurs between the first timestamp and the second timestamp. The machine learning model is trained based on the plurality of sets of the data objects and corresponding issue patterns associated with the corresponding previous application issues. The plurality of sets of the data objects comprises a plurality of operation changes associated with the corresponding applications. The processor processes, through a neural network, the issue pattern with application information to determine a series of executable operations associated with the application issue. The series of the executable operations is indicative of a solution of the application issue and corresponds to the change of the operation status of the application. The processor deploys the series of the executable operations to the application running at the network node to solve the application issue to prevent a failure operation of the application.

In one embodiment, a system for implementing auto-correction to solve dynamic issues in a distributed network comprises a memory and a processor operably coupled to the memory. The memory is operable to store a plurality of sets of previous data objects associated with corresponding previous operation issues and issue patterns associated with corresponding applications. Each data object represents an operation status of a corresponding application. Each issue pattern represents one or more recurring operation status of the corresponding application and is associated with one or more executable operations. The memory is further operable to store a plurality of series of executable operations associated with the corresponding issue patterns configured to solve the previous application issues. The processor detects an application issue associated with an application running at a network node at a particular timestamp. The application issue comprises a user request with an issue statement and a user interaction associated with one or more operation parameters of the application. The processor receives a set of data objects associated with the application issue occurring at the timestamp. The processor classifies, by a machine learning model, the set of the data objects of the application issue into one or more issue patterns. The machine learning model is trained based on the plurality of sets of the data objects and the issue patterns associated with the corresponding previous application issues. The processor processes, through a neural network, the one or more issue patterns and application information associated with the application issue at the network node to determine a series of executable operations configured to solve the application issue. The neural network is trained based on the plurality of the issue patterns and associations between the issue patterns and the plurality of series of the executable operations. The series of executable operations comprises a network node address and an application identifier. The processor determines whether the network node is communicating with the processor. In response to determining that the network node is communicating with the processor, the processor determines whether the application is currently running at the network node. In response to determining that the application is currently running at the network node, the processor deploys the series of the executable operations to the network node based at the network node address and the application identifier. The series of the executable operations is configured to be automatically executed at the network node to correct the one or more parameters of the application to prevent a failure operation of the application.

The system described in the present disclosure provides practical applications with technical solutions to solve the technical problems of the previous systems. The disclosed system provides practical applications which may be executed to solve underlying computer network operation issues running at particular network nodes in the distributed network system by automatically generating and deploying strategic solutions for various dynamic issues. For example, a sense module, a strategy module, an action module, and other software models or modules may be integrated into a software application. The server may execute the software application to process data objects associated with application issues, and automatically determine and deploy solutions to solve the application issues occurring at the network in real time. The practical application may be implemented by the processor to identify a plurality of issue patterns from the plurality of sets of the data objects by classifying the plurality of sets of the previous data objects. The processor may execute the neural network to determine a solution identifier for each series of executable operations associated with a corresponding application issue. The processor may associate the corresponding solution identifier with the issue pattern and the corresponding application issue. The practical application may be implemented by the processor of the server to deploy the series of the executable operations to the network node in response to determining that the network node is communicating with the processor. The series of the executable operations is configured to be automatically executed at the network node to solve the application issue before a problem occurs. The processor may determine a deployment result of the application. For example, the practical application may prevent network node malfunction, data access conflict issue, memory capacity issue, processor capacity issue, etc.

The disclosed system provides several technical advantages that overcome the previously discussed technical problems. The system determines a series of executable operations for solving the application issue. The system also deploys the series of the executable operations for solving the application issue at the network node to prevent a failure of application. The application may be implemented to monitor computer operations on network nodes, sense and detect network application processing and data communication issues underling the computer network. For example, the system may determine optimum solutions corresponding to different percentages (e.g., 5%, 10%, or 20%) of the memory needed to be increased so that the application executed at the network node is not failed due to lack of a memory space.

Thus, the application may be implemented to avoid underlying computer application issues in the distributed network, such as a memory utilization issue, a data accessibility issue, an application configuration issue, etc. The disclosed system may automatically identify dynamic issues in real time and solve them with intelligent solutions to provide ceaseless support to all applications in the distributed network. Further, the system may detect application issue based on user requests user interactions with an application or system and provide corresponding solutions issue in real time. The solutions are generated and deployed to the corresponding network nodes based on dynamic nature of issues.

The disclosed system provides seamless support with end-to-end automation on classifying dynamic issues or user requests into issue patterns. The disclosed system determines executable strategies based on the issue patterns to solve the potential issues or problems associated with applications and devices which are operating at certain network nodes. The disclosed system provides an automated issue determining and solution deployment process without administrator intervention at a faster pace. By preventing administrator interactions, the disclosed system can efficiently process user requests and prevent any unnecessary increases in network resources and bandwidth that are consumed that would otherwise negatively impact on information processing of an organization and the throughput of the computer system. The disclosed system may identify and solve potential problems quickly before the problems occur at certain network nodes in the distributed network. The disclosed system enables the applications issues to be resolved without administrator intervention efficiently. The disclosed system enables all application issues and user requests to be resolved on time so that the system may provide continuous availability of services to the users in the distributed network.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

As described above, previous technologies fail to provide efficient and reliable solutions to automatically detect and solve dynamic issues associated with applications in a distributed network. This disclosure presents various systems and methods for automatically detecting dynamic issues, and determining and deploying solutions with executable operations to solve the dynamic issues in the distributed network by referring to FIGS. 1-5.

System Overview

Figure 1:
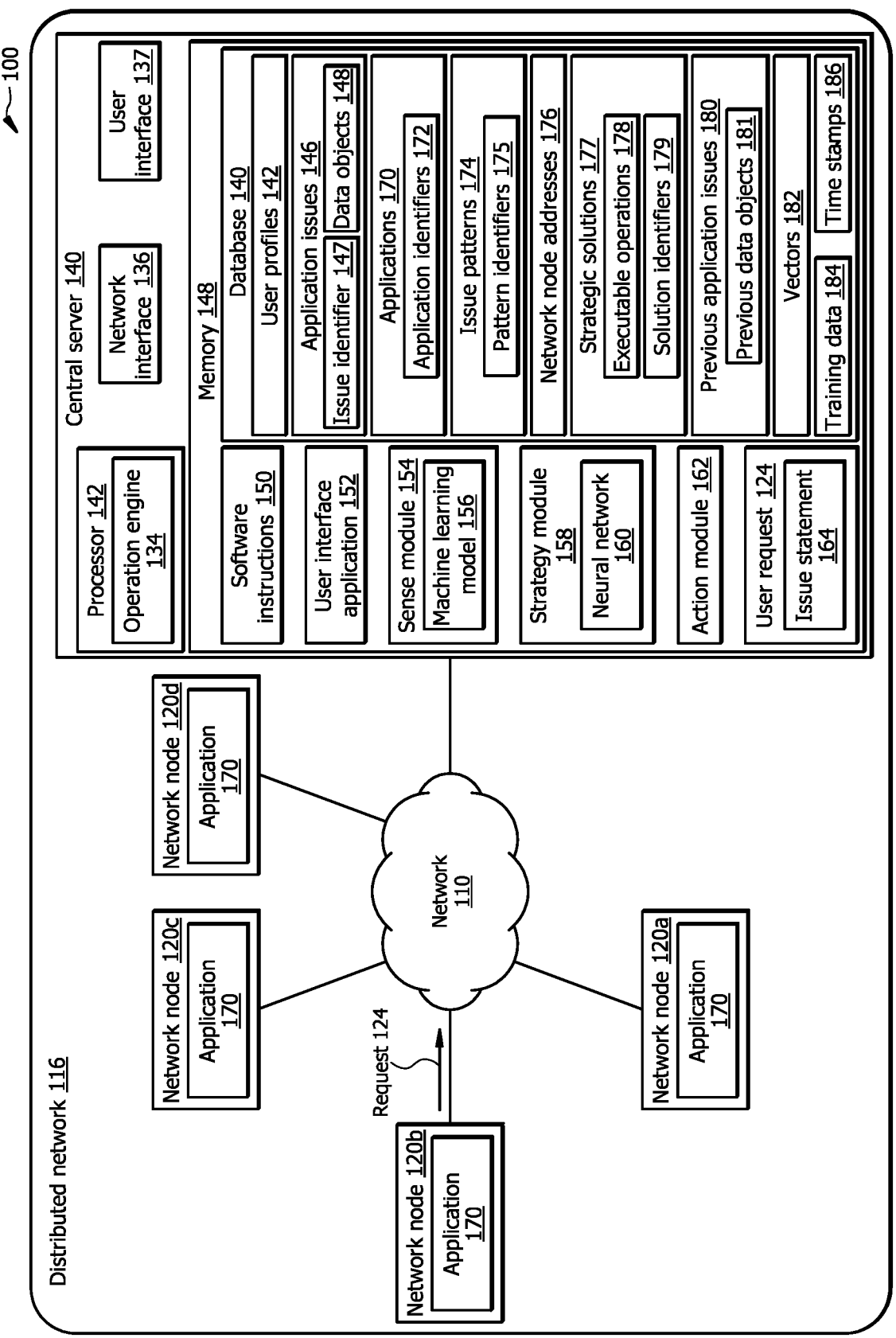
FIG. 1 illustrates an embodiment of a system configured to auto-detect dynamic issues occurring in a distributed network and auto-determine and deploy solutions to solve the dynamic issues according to an illustrative embodiment of the present disclosure.

FIG. 1 illustrates one embodiment of a system 100 that is configured to automatically detect dynamic issues, determine and deploy the solutions to solve the dynamic issues occurring in a distributed network. In one embodiment, system 100 comprises a central server 130, a plurality of network nodes 120a-120d (e.g., computing devices), and a network 110. Each network node 120 represents a computing device, such as a user device or a server which is coupled to the network 110 in a distributed network 116. Network 110 enables the communication between components of the system 100. The system 100 transmits data between central server 130 and network nodes 120a-120d through the network 110. Central Server 130 comprises a processor 132 in signal communication with a memory 138. Memory 138 stores software instructions 150 that when executed by the central server 130, cause the central server 130 to execute one or more functions described herein. The central server 130 is in communication with each network node 120 via the network 110. The central server 130 may monitor operation status of a plurality of applications 170 operating at different network nodes 120 in the distributed network 116 in the system 100. In other embodiments, system 100 may not have all the components listed and/or may have other elements instead of, or in addition to, those listed above.

In some embodiments, the system 100 may be implemented by the central server 130 to automatically detect dynamic issues occur to each network node 120, and determine and deploy solutions with corresponding executable operations 178 to solve the application issues 146 occurring at corresponding network nodes 120. Each dynamic issue may be an application issue 146 associated with a software application or a hardware application associated with a device operating at the network node 120. For example, an application issue 146 may be a memory utilization issue, a data accessibility issue, or an application configuration issue associated with an application 170 running at a network node 120. The central server 130 may detect an application issue 146 associated with an application 170 running at the network node 120. The central server 130 automatically detects and analyzes an application status associated with one or more applications 170 running at the one or more network nodes 120. The application status may be presented as a set of data objects 148 and stored in a database 140. The central server 130 uses a machine learning model 156 to classify the set of the data objects 148 of the application issue 146 into one or more issue patterns 174. The central server 130 uses a machine learning model 156 to analyze the plurality of the data objects 148 and identify one or more issue patterns 174 associated with the application issue 146. The central server 130 further uses a neural network 160 to determine a strategic solution 177 with a series of executable operations 178 for solving the application issue 146 based on the one or more issue patterns 174. The central server 130 automatically deploys the series of the executable operations 178 to solve the application issue 146 to reduce the chances of a failed operation of the application 170 at the network node 120.

In one embodiment, a system 100 may be implemented by the central server 130 to auto-detect dynamic issue changes in the distributed network 116. The central server 130 detects an application issue 146 at a network node 120 and receives a first set of data objects 148 associated with the application issue 146 occurring at the first timestamp 186. The central server 130 receives a second set of data objects 148 associated with the application issue 146 occurring at the second timestamp 186. The central server 130 determines a change between a first set of the data objects 148 and a second set of data objects 148. The central server 130 uses a machine learning model 156 to analyze the change between a first set of the data objects 148 and a second set of data objects 148. The central server 130 identifies an issue pattern 174 representing the operation change of the application issue 146 or the application 170 between the first timestamp 186 and the second timestamp 186. The central server 130 further uses a neural network 160 to process the issue pattern 174 and the application information to determine a strategic solution 177 with a series of executable operations 178. The series of the executable operations 178 is indicative of a solution of the application issue 146 and corresponds to the operation change of the operation status of the application 170. The series of the executable operations 178 is configured to solve the application issue 146 at the network node 120. The central server 130 automatically deploys the series of the executable operations 178 to the network node 120 to solve the application issue 146 to prevent a failure operation of the application 170 at the network node 120.

In one embodiment, a system 100 may be implemented by the central server 130 to implement auto-correction to solve dynamic issues in a distributed network 116. Each dynamic issue may be an application issue 146 associated with a software application or a hardware application running at the network node 120. For example, the central server 130 detects an application issue 146 associated with an application 170 running at a network node 120 at a particular timestamp 186. The application issue 146 may be associated with a user request 124 which includes an issue statement 164 and a user interaction associated with one or more operation parameters of an application 170. The central server 130 may automatically detect and analyze an application status associated with the application 170 running at the network node 120. The central server 130 may generate textual data of an operation status of the application 170 to represent the application issue 146 occurring at the network node 120. The central server 130 may convert the textual data of the operation status of the application 170 into a set of data objects 148 associated with the application issue 146. The application status may be presented as a set of data objects 148 and stored in a database 140. The central server 130 uses a machine learning model 156 to analyze the plurality of the data objects 148 and identify one or more issue patterns 174 associated with the application issue 146. The central server 130 further uses a neural network 160 to process the one or more issue patterns 174 and the application information to determine a strategic solution 177 with a series of executable operations 178. The series of the executable operations 178 is indicative of a solution of the application issue 146. The series of executable operations 178 is associated with a network node address 176 and an application identifier 172. When the central server 130 determines that the network node 120 is communicating with the processor 132 and the application 170 is currently running at the network node 120, the central server 130 automatically deploys the series of the executable operations to the network node 120. The series of the executable operations is configured to be automatically executed at the network node 120 to correct the one or more parameters of the application 170 to prevent a failure operation of the application 170.

System Components

Network 110 may be any suitable type of wireless and/or wired network, including, but not limited to, all or a portion of the Internet, an Intranet, a private network, a public network, a peer-to-peer network, the public switched telephone network, a cellular network, a local area network (LAN), a metropolitan area network (MAN), a wide area network (WAN), and a satellite network. The network 110 may be configured to support any suitable type of communication protocol as would be appreciated by one of ordinary skill in the art.

Figure 2:
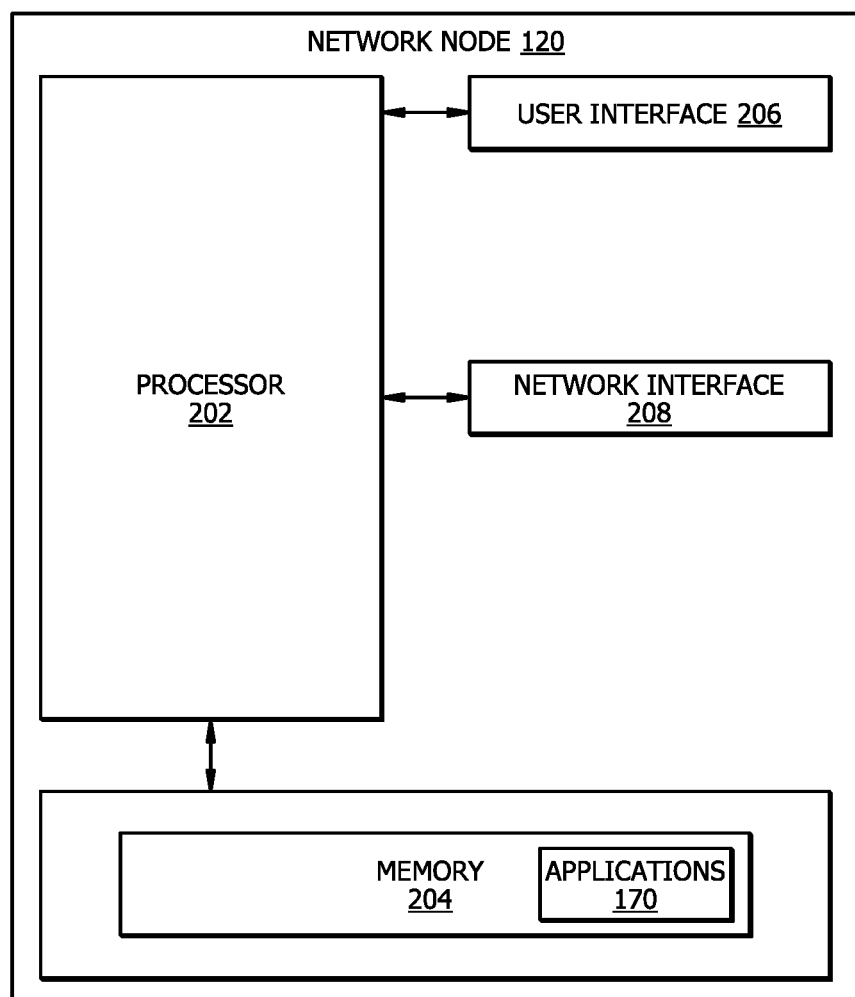
FIG. 2 is a block diagram of an example network node of the system of FIG. 1.

FIG. 2 is a block diagram of an embodiment of a network node 120 in FIG. 1. The network node 120 is generally any device that is configured to process data and interact with users. Examples of the network node 120 include, but are not limited to, a personal computer, a desktop computer, a workstation, a server, a laptop, a tablet computer, a mobile phone (such as a smartphone), etc. The network node 120 may include a user interface, such as a display, a microphone, keypad, or other appropriate terminal equipment usable by user. The network node 120 may include a hardware processor, memory, and/or circuitry configured to perform any of the functions or actions of the network node 120 described herein.

The network node 120 comprises a processor 202, a memory 204, a user interface 206, network interface 208, and other components in the system 100. The processor 202 comprises one or more processors operably coupled to and in signal communication with memory 204, user interface 206, network interface 208, and other components in the system 100. The one or more processors is any electronic circuitry including, but not limited to, state machines, one or more central processing unit (CPU) chips, logic units, cores (e.g., a multi-core processor), field-programmable gate array (FPGAs), application specific integrated circuits (ASICs), or digital signal processors (DSPs). The processor 202 may be a programmable logic device, a microcontroller, a microprocessor, or any suitable combination of the preceding. The one or more processors are configured to process data and may be implemented in hardware or software. For example, the processor 202 may be 8-bit, 16-bit, 32-bit, 64-bit or of any other suitable architecture. The processor 202 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute instructions to implement the function disclosed herein, such as some or all of those described with respect to FIGS. 1 and 3-5. Network interface 208 may be configured to use any suitable type of communication protocol and enable wired and/or wireless communications as would be appreciated by one of ordinary skill in the art.

The memory 204 of the network node 120 stores and/or includes a plurality of applications 170. Each application 170 may be a software, mobile, or web application installed at the network node 120 to perform specific functions. The application 170 can be accessed from the network node 120. Each application 170 may be associated with an organization that provides services and/or products to users. For example, an application 170 may be used by a user to access a user interface application 152 to interact with the organization for an application service through the central server 130. The application 170 may be used by a user to submit a user request 124 associated with an application issue 146. The application 170 may allow users to access their user profiles 142 via the network nodes 120. A user profile 142 may be stored in a database 140 communicatively coupled with the components of the central server 130.

In some examples, each network node 120 may include a database or a storage architecture, such as a network-attached storage cloud, a storage area network, a storage assembly, computer storage disk, computer memory unit, computer-readable non-transitory storage media directly (or indirectly) coupled to one or more components of the system 100.

Central Server

Central server 130 is generally a server, or any other device configured to process data and communicate with network nodes 120 via the network 110. The central server 130 is organized in a distributed manner and be implemented in the cloud. The central server 130 is generally configured to oversee the operations of the network nodes 120, as described further below in conjunction with the operational flows of the methods 300, 400 and 500 described in FIGS. 3-5.

Processor 132 may comprise one or more processors operably coupled to the memory 138. The processor 132 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 132 may be a programmable logic device, a microcontroller, a microprocessor, or any suitable combination of the preceding. The one or more processors are configured to process data and may be implemented in hardware or software. For example, the processor 132 may be 8-bit, 16-bit, 32-bit, 64-bit, or of any other suitable architecture. The processor 132 may include an arithmetic logic unit (ALU) for performing arithmetic and logic operations. The processor 132 registers the supply operands to the ALU and stores the results of ALU operations, and a control unit that fetches instructions from memory and executes them by directing the coordinated operations of the ALU, registers and other components. The one or more processors are configured to implement various instructions. For example, the one or more processors are configured to execute instructions (e.g., software instructions 150) to implement the operation engine 134. An operation engine 134 may include, but is not limited to, one or more separate and independent software and/or hardware components of a central server 130. In this way, the processor 132 may be a special-purpose computer designed to implement the functions disclosed herein. In one embodiment, the processor 132 is implemented using logic units, FPGAs, ASICs, DSPs, or any other suitable hardware. The processor 132 is configured to operate to perform one or more operations as described in FIGS. 3-5.

Network interface 136 is configured to enable wired and/or wireless communications (e.g., via network 110). The network interface 136 is configured to communicate data between the central server 130 and network nodes 120, databases, systems, or domains. For example, the network interface 136 may comprise a WIFI interface, a local area network (LAN) interface, a wide area network (WAN) interface, a modem, a switch, or a router. The processor 132 is configured to send and receive data using the network interface 136. The network interface 136 may be configured to use any suitable type of communication protocol as would be appreciated by one of ordinary skill in the art.

Memory 138 may be volatile or non-volatile and may comprise a read-only memory (ROM), random-access memory (RAM), ternary content-addressable memory (TCAM), dynamic random-access memory (DRAM), and static random-access memory (SRAM). Memory 138 may be a non-transitory computer-readable medium implemented using one or more disks, tape drives, solid-state drives, and/or the like. Memory 138 is operable to store the software instructions 150 and/or any other data or instructions. The software instructions 150 may store any suitable set of instructions, logic, rules, or code operable to be executed by the processor 132 to implement the processes and embodiments described below. In an example operation, the memory 138 may store a user interface application 152, a sense module 154, a strategy module 158, an action module 162, and other program modules which are implemented in computer-executable software instructions, such as software instructions 150. The user interface application 152 is configured to facilitate communications and operations of the central server 130 through a user interface 137 of the central server 130. The sense module 154 may be implemented by a machine learning model 156 and one or more other software models. The machine learning model 156 may comprise machine learning algorithms including support vector machine, random forest, k-means clustering, etc. The machine learning model 156 may be trained to classify a set of the data objects 148 of the application issue 146 into one or more issue patterns 174. The strategy module 158 may include a neural network 160 and one or more other software models. The neural network 160 may be implemented by a plurality of neural network (NN) layers, Convolutional NN (CNN) layers, Long-Short-Term-Memory (LSTM) layers, Bi-directional LSTM layers, Recurrent NN (RNN) layers, a Generative Adversarial Network (GAN), and the like. The neural network 160 may be trained to process the one or more issue patterns 174 and application information associated with an application issue 146 to determine a strategic solution 177 with a series of executable operations 178 for solving the application issue 146.

Database 140 may be a remote database, a cloud database, or an on-site internal database. Database 140 may be coupled to or in communication with and accessed by the central server 130 via the network 110. As illustrated in FIG. 1, the database 140 may be an internal database and stored in the memory 138. The database 140 stores information including user profiles 142, application issues 146 with issue identifiers 147, applications 170 with application identifiers 172, issue patterns 174 with pattern identifier 175, network node addresses 176, strategic solutions 177 with solution identifiers 179, previous application issues 180, previous data objects 181, vectors 182, training data 184, time stamps 186. A plurality of application issues 146 include a plurality of sets of data objects 148. Each application issue 146 may include a corresponding set of data objects 148 associated with a solution identifier 179. A plurality of strategic solutions 177 include a plurality of series of executable operations 178. Each strategic solution 177 includes a corresponding series of executable operations 178.

Operation Engine

In some embodiments, the operation engine 134 may be implemented by the processor 132 to monitor operations of a plurality of applications 170 running at various network nodes 120 in a distributed network 116. The operation engine 134 may be implemented by the processor 132 to automatically detect dynamic issues associated with applications 170 operating at the network nodes 120. The operation engine 134 may be implemented by the processor 132 to determine and deploy the solutions to solve the dynamic issues to prevent or avoid failure operations of the applications 170 at the corresponding network nodes 120 in real time.

In some embodiments, the operation engine 134 may be implemented by the processor 132 to execute a sense module 154 with the software instructions 150 to automatically detect and collect operation status of a plurality of applications 170 which operate at corresponding network nodes 120 at various timestamps 186 in real time. The sense module 154 may be executed to identify certain application issues 146 which may cause failure operations of the corresponding applications 170 at the network nodes 120. The sense module 154 may include a machine learning model 156 which is trained to identify issue patterns 174 of the application issues 146 associated with the applications 170 running at the network nodes 120.

In some embodiments, the operation engine 134 may be implemented by the processor 132 to execute the strategy module 158 with the software instructions 150 to automatically determine strategic solutions 177 based on the issue patterns 174 for the application issues 146. Each strategic solution 177 may include a series of executable operations 178. The series of executable operations 178 is configured to solve each corresponding application issue 146 to prevent a failure operation of the application 170 at the corresponding network node 120 in real time.

In some embodiments, the operation engine 134 may be implemented by the processor 132 to execute an action module 162 with the software instructions 150 to automatically deploy the each corresponding strategic solution 177 with the series of the executable operations 178 to solve each application issue 146. This process may prevent a failure operation of the application 170 before a problem or related to the application issue 146 occurs at the corresponding network node 120. The operation of the disclosed system 100 is described below.

Detecting Dynamic Issues Occurring in a Distributed Network

This process may be implemented by central server 130 to execute the sense module 154 to detect dynamic issues occurring at various network nodes 120 in a distributed network 116. In one embodiment, the sense module 154 may be executed by the processor 132 to track and detect operation status of a plurality of applications 170 and associated devices operating at the network nodes 120. The central server 130 may detect and receive corresponding application information associated with the applications 170 running at the network nodes 120 in real time.

An application issue 146 may be associated with the applications 170 running at a network node 120. The sense module 154 may be executed by the processor 132 to detect operation data of the network node 120. The operation data of the network node 120 may include network node status and signals from or sent to the network node 120. If the network node 120 is active and communicates with the processor 132 of the central server 130, the sense module 154 may be executed by the processor 132 to detect current traffic into the network node 120 and current output of the network node 120. If the network node 120 does not communicate with the processor 132 of the central server 130, there is no signal sent to the central server 130 or from the network node 120. The network node 120 does not respond to any requests from the central server 130. The sense module 154 may be executed by the processor 132 to receive the operation data of the network node 120 and store it in the database 140. The sense module 154 may be executed by the processor 132 to process the operation data of each network node 120 and detect any dynamic application issues 146 associated with the network node 120 in real time.

The sense module 154 may be executed by the processor 132 to identify an application issue 146 associated with a software application 170 or a network device operating with the software application 170 at a network node 120. In some embodiment, the sense module 154 may be executed by the processor 132 to receive application information associated with application issues 146 occurring at certain network nodes 120 through a blockchain network using a distributed hash technology. The application information may include textual data of an operation status of the application 170. The central server 130 may store and update the textual data of the operation status of the application 170 in the database 140 in real time.

The operation status of the application 170 may include one or more measurable features of CPU utilization, memory capacity, memory utilization, a user login information, memory boundary, data accessibility associated with the application 170, network node address 176, network node status, input data, output data, an application issue statement 164, timestamps 186, and any other data associated with the application 170 and the corresponding network node 120. One or more measurable features of the CPU utilization may represent processor performance associated with the network node 120. The input data may represent various signals received by the network node 120 from users or other network nodes 120. In some embodiments, one or more measurable features of the operation status of an application 170 may include one or more operation parameters associated with CPU utilization, memory utilization, memory boundary, signals from and sent to a network node 120, user activities of accessing the application 170, network node address 176, network node status, or a certain time of period.

The sense module 154 may be executed by the processor 132 to identify a plurality of dynamic application issues 146, such as memory utilization, network port, data accessibility, application operation configuration, resource contention, etc.

In one embodiment, the sense module 154 may be executed by the processor 132 to detect an application issue 146, such as a memory utilization issue associated with the application 170 running at the network node 120. For example, the application 170 may require a certain memory capacity to run properly at the network node 120. The central server 130 may receive application information of the application 170, such as a memory utilization capacity, a memory boundary, a free memory, etc. The sense module 154 may be executed by the processor 132 to detect that the memory utilization of the application 170 may cross the memory boundary. The application 170 requires more memory to operate properly at the network node 120. The central server 130 needs to provide a solution to ensure that enough memory is assigned to the application 170 to prevent a failure operation of the application 170 at the network node 120. The sense module 154 may be executed by the processor 132 to identify such a memory utilization issue before the memory utilization of the application 170 crosses the memory boundary.

In one embodiment, an application issue 146 may be associated with a processor performance issue occurring at a network node 120. The sense module 154 may be executed by the processor 132 to monitor the processor performance such as power consumption. The central server 130 may receive the processor performance information and the corresponding operation data. The sense module 154 may be executed by the processor 132 to identify an application issue 146 associated with power consumption of a processor at the network node 120 based on the processor performance information and the corresponding operation data.

In one embodiment, an application issue 146 may be related to a data access conflict issue associated with an application 170 running at the network node 120. For example, different users may request to access to a file stored in the memory 138 or the database 140. The sense module 154 may be executed by the processor 132 to detect various data access issues associated with the data access request based on the user inputs, application operations, and operation results. For example, a user may access to the application 170 for data processing. Some functions associated with the application 170 may be configured to be authorize some users to access but block other users from accessing. The user may request to access some portions of the file associated with the application 170 but not be able to access them from a network node 120. The reason is some portions of the file may be read or write locked for the user. The central server 130 may store user inputs, application operations, and operation results associated with a user request 124 to access the file associated with the application 170.

In some embodiments, the sense module 154 may be executed by the processor 132 to generate textual data of an operation status of the application 170 to represent the application issue 146 occurring at the network node 120. The sense module 154 may be executed by the processor 132 to convert the textual data of the operation status of the application 170 into a set of data objects 148. The set of the data objects 148 may include a set of vectors 182 with a set of numerical values. The set of the vectors 182 are vector representations of the corresponding operation status associated with the application issue 146.

In some embodiments, a database 140 may store a plurality of sets of previous data objects 181 associated with a plurality of previous application issues 180. The previous application issues 180 previously occurred at various network nodes 120. Each previous application issue 180 may be represented by a set of previous data objects 181. Each set of the previous data objects 181 may include a corresponding set of vectors 182 with a set of numerical values.

Identify Issue Patterns of Application Issues

This process may be implemented by the central server 130 to execute the sense module 154 to identify one or more issue patterns 174 for an application issue 146 based on a set of data objects 148. The set of the data objects 148 represents the application issue 146 occurring at a network node 120 at a timestamp 186. Each issue pattern 174 represents one or more recurring operation status of the application 170. Each issue pattern 174 is associated with a strategic solution 177 with a series of executable operations 178. Each strategic solution 177 may be represented as solution identifier 179. In some embodiments, the sense module 154 may include a machine learning model 156 used to identify one or more issue patterns 174 based on the set of data objects 148 associated with the application issue 146.

The machine learning model 156 may be trained with training data 184. The training data 184 may include a plurality of sets of previous data objects 181 associated with corresponding previous application issues 180, issue patterns 174, pattern identifiers 175, a plurality of strategic solutions 177 with series of executable operations 178, and any other data associated with the plurality of the previous application issues 180. The database 140 may store different issue patterns 174. Each issue pattern corresponds to a strategic solution 177 for an application issue 180.

The trained machine learning model 156 may be used to identify one or more issue patterns 174 based on a set of data objects 148 associated with an application issue 146 occurring at a network node 120. For example, the sense module 154 may be executed by the processor 132 to identify an issue pattern 174 based on the plurality of data objects 148 associated with a memory utilization issue.

In some embodiments, the machine learning model 156 may be trained to classify a plurality of sets of the previous data objects 181 associated with the previous application issues 180 to generate multiple clusters of issue patterns 174.

Each cluster of the issue patterns 174 may include one or more issue patterns 174 for an application issue 180. Each issue pattern 174 for an application issue 180 has a pattern identifier 175.

In some embodiments, the sense module 154 may be executed by the processor 132 to identify an application issue 146 by processing a user request 124 with an issue statement 164 for an application issue 146. For example, the sense module 154 may be executed by the processor 132 to identify the application issue 146, such as a data access conflict issue associated with an application 170 running at a network node 120. The issue statement 164 may include a set of data objects 148 of the data access conflict issue. The sense module 154 may be executed by the processor 132 to process the set of data objects 148 to generate one or more issue patterns 174 for the data access conflict issue.

Identify Issue Patterns of Application Issues Based on Operation Changes

This process may be implemented by the central server 130 to execute the sense module 154 to identify one or more issue patterns 174 based on operation changes associated with an application issue 146 occurring at a network node 120.

The sense module 154 may be executed by the processor 132 to automatically detect the operation changes associated with the application issue 146 occurring at a network node 120 at various timestamps 186. The operation changes may represent changes between different sets of data objects 148. The changes between different sets of data objects 148 correspond to operation changes between different application status for the application issue 146. The plurality of sets of the previous data objects 181 stored in the database 140 may include the changes between different sets of previous data objects 181 corresponding to operation changes of the previous application issues 180.

In one embodiment, the machine learning model 156 may be trained with training data 184. The training data 184 may include the changes between different sets of previous data objects 181 associated with corresponding previous application issues 180, issue patterns 174, pattern identifiers 175, a plurality of series of executable operations 178, and any other data associated with a plurality of the previous application issues 180.

The sense module 154 may be executed by the processor 132 to use the trained machine learning model 156 to identify one or more issue patterns 174 for an application issue 146 based on operation changes of the application issue 146. The data of operation changes of the application issue 146 at a network node 120 are received by the central server 130 at different timestamps 186. The one or more issue patterns 174 may represent the operation changes of an application issue 146 which occurs at the network node 120 between different timestamps 186.

The sense module 154 may be executed by the processor 132 to continuously detect and receive application information or operation status of the application issue 146 occurring at the network node 120. For example, the sense module 154 may be executed by the processor 132 to detect the memory utilization information of the application issue 146 is increased continuously (e.g., from 60% to 70%) at a network node 120. The sense module 154 may be executed to by the processor 132 to determine the changes of memory utilization of the application issue 146 at different timestamps 186. The sense module 154 may be executed by the processor 132 to generate one or more updated issue patterns 174 dynamically in real time. The one or more issue patterns 174 may be updated corresponding to the operation changes for the application issue 146. Further, the one or more pattern identifier 175 may be dynamically updated corresponding to the updated issue patterns 174 based on the changed or updated application status for the application issue 146.

In some embodiments, the sense module 154 may be executed by the processor 132 to generate refined issue patterns with corresponding solution operations. For example, the sense model may generate different clusters of issue patterns 174 for different application issues 146, such as the memory utilization issue, the data processing issue, application configuration issue, the data access conflict issue, etc.

In some embodiments, different issue patterns 174 may be generated for an application issue 146. The sense module 154 may be executed by the processor 132 to process the plurality of the data objects 148 of the application issue 146 into a cluster of issue patterns 174. Each issue pattern 174 within the cluster is associated with a unique strategic solution 177 with a series of executable operations 178. The database 140 may store different issue patterns 174 with each corresponding strategic solution 177. Different issue patterns 174 corresponds to different strategic solutions 177. Each issue pattern 174 may be associate with a strategic solution 177 and a unique set of executable operations 178. An application issue 146 may be solved by deploying executing a strategic solution 177 with the set of executable operations 178 at the network node 120.

Generate Strategic Solutions to Solve Application Issues

In some embodiments, the strategy module 158 may be executed by the processor 132 to generate a strategic solution 177 to solve an application issue 146 to prevent a failure operation of the application 170 at the network node 120. The strategic solution 177 may include a series of the executable operations 178 to solve the application issue 146 and prevent a failure of operation of the application 170 at the network node 120. The series of the executable operations 178 may include a plurality of executable instructions.

The strategy module 158 may include a neural network 160. The neural network 160 may be trained with training data 184 to automatically determine a strategic solution 177 with a series of executable operations 178 based on each issue pattern 174 associated with each application issue 146. The training data 184 may include solution identifiers 179, the plurality of series of executable operations 178, a plurality of issue patterns 174, pattern identifiers 175, issue identifiers 147, application identifiers 172 associated with the applications 170, network node addresses 176, and any other data associated with the previous application issues 180.

The process of training the neural network 160 may include converting data of the issue patterns 174 to a plurality of neural nodes of a neural network 160. The issue patterns 174 are associated with corresponding previous application issues 180. The issue patterns 174 are associated with a plurality of strategic solutions 177 and a plurality of series of executable operations 178. The neural network 160 may be trained by the central server 130 to determine a solution identifier 179 with a series of executable operations 178 corresponding to one or more issue patterns 174. The one or more issue patterns 174 are associated with an application issue 146 for an application 170.

In a training process, the operation engine 134 may be executed by the processor 132 to train a neural network 160 with the training data 184 to determine a set of strategic solutions 177 for corresponding application issues 146. The central server 130 may use the trained neural network 160 to determine a strategic solution 177 based on an issue pattern 174 for an application issue 146. A strategic solutions 177 may is associated with a solution identifier 179 and include a series of executable operations 178. Each solution identifier 179 is associated with a strategic solution 177, an issue pattern identifier 175, an issue identifier 147, and an application identifier 172.

A trained neural network 160 may be executed by the processor 132 to process the issue patterns 174 associated with dynamic application issues 146 and generate a plurality of strategic solutions 177 for a plurality of dynamic application issues 146 associated with corresponding applications 170, such as memory utilization, network port, data accessibility, runtime data processing related to application operation configuration, etc. Input data of the neural network 160 may include data of an issue pattern 174 and application information associated with an application issue 146. Output data of the neural network 160 may include a strategic solution 177 with a set of series of executable operations 178 for issue pattern 174 for the particular application issue 146.

For example, the trained neural network 160 may be executed by the processor 132 to solve the data access conflict issue associated with file with read or write locked for the application issue 146 associated with data accessibility. The strategy module 158 may be executed by the processor 132 to generate an example strategic solution 177 with a series of executable operations 178 to unlock some objects of the file. The series of executable operations 178 may include configuring writing lock by enable writing function, automatically unlocking write and send the user reminder to access, identifying the time interval (e.g., 1 minute) that the application 170 needs to unlock certain data blocks, sending a notification to the user and ask the user to wait for the recommended time interval to access the data, etc.

In another example, the trained neural network 160 may be executed by the processor 132 may be implemented to determine how much memory needs to increase so that the application 170 is not failed. The series of the executable operations 178 may be configured to solve an application issue 146 associated with memory utilization by increasing a size of memory with a backup memory space. For example, the strategy module 158 may be executed by the processor 132 to generate a strategic solution 177 to increase the memory space by 10% to prevent a failure operation of application 170.

Deploy Solutions for Dynamic Application Issues

An action module 162 may be executed by the processor 132 to automatically deploy the strategic solutions 177 with the series of the executable operations 178 to the network node 120. The series of the executable operations 178 are configured to seamlessly solve the application issue 146 to prevent a failure operation of the application 170 without any manual operations. For example, the action module 162 may be executed by the processor 132 to take control the application 170 running at the network node 120 and deploy the solution to the network node where the application issue 146 may happen.

In some embodiments, a series of example executable operations 178 to solve the application issue 146 may include one or more of:
1) a solution identifier 179,
2) an issue pattern identifier 175;
3) an issue identifier 147 of an application issue 146;
4) application login authentication information,
5) one or more security rules to access the application;
6) an application identifier 172 of an application 170,
7) a network node identifier indicative of a network node address 176,
8) a set of executable instructions for solving the application issue 146, or
9) a current status of the application associated with the application issue 146.

In one embodiment, before deploying a strategic solution 177 with a set of series of executable operations 178 to the network node 120, the action module 162 may be executed by the processor 132 to identify a status of the application 170, a status of the network node 120, and the components associated with the application issue 146. For example, the action module 162 may be executed by the processor 132 to determine whether the network node 120 is communicating with the processor 132. In response to determining that the network node 120 is communicating with the processor 132, the action module 162 may be executed by the processor 132 to further determine whether the application 170 is currently running at the network node 120. In response to determining that the application 170 is currently running at the network node 120 and the network node 120 is communicating with the processor 132, the action module 162 may be executed by the processor 132 may deploy the series of the executable operations 178 to the network node 120 based at the network node 120 address and the application identifier 172.

For example, the central server 130 may determine whether the application issue 146 is related to a software application 170 or a hardware device failure. For an application issue 146 associated with a software failure, the central server 130 may implement a strategic solution 177 to restart the network node 120, reinstall the application 170, etc. For a hardware failure, the central server 130 may generate a notification to request an administrator to solve the application issue 146.

In one embodiment, before deploying a strategic solution 177 with a set of series of executable operations 178 to the corresponding network node 120, the action module 162 may be executed by the processor 132 to identify one or more issue components associated with the application issue 146 to be solved. The action module 162 may be executed by the processor 132 to deploy a set of series of executable operations 178 to the corresponding network node 120 to configure the one or more issue components associated with the application issue 146. For example, the one or more issue components associated with the application issue 146 and the application 170 may include one or more measurable features of CPU utilization, memory capacity, memory utilization, a user login information, memory boundary, data accessibility associated with the application, network node address, network node status. The set of series of executable operations 178 is configured to be executed at the network node 120 to solve the application issue 146.

In one embodiment, to solve the application issue 146 related to a memory utilization issue, the action module 162 may be executed by the processor 132 to access the application 170 operating at the network node 120 and take over an administrative privilege with a user login information. The action module 162 may further be executed by the processor 132 to apply the series of executable operations 178 to increase a memory capacity of the network node 120 so that the corresponding application 170 runs properly at the network node 120. In this way, the application 170 running at the network node 120 does not fail due to lack of a memory space.

Figure 3:
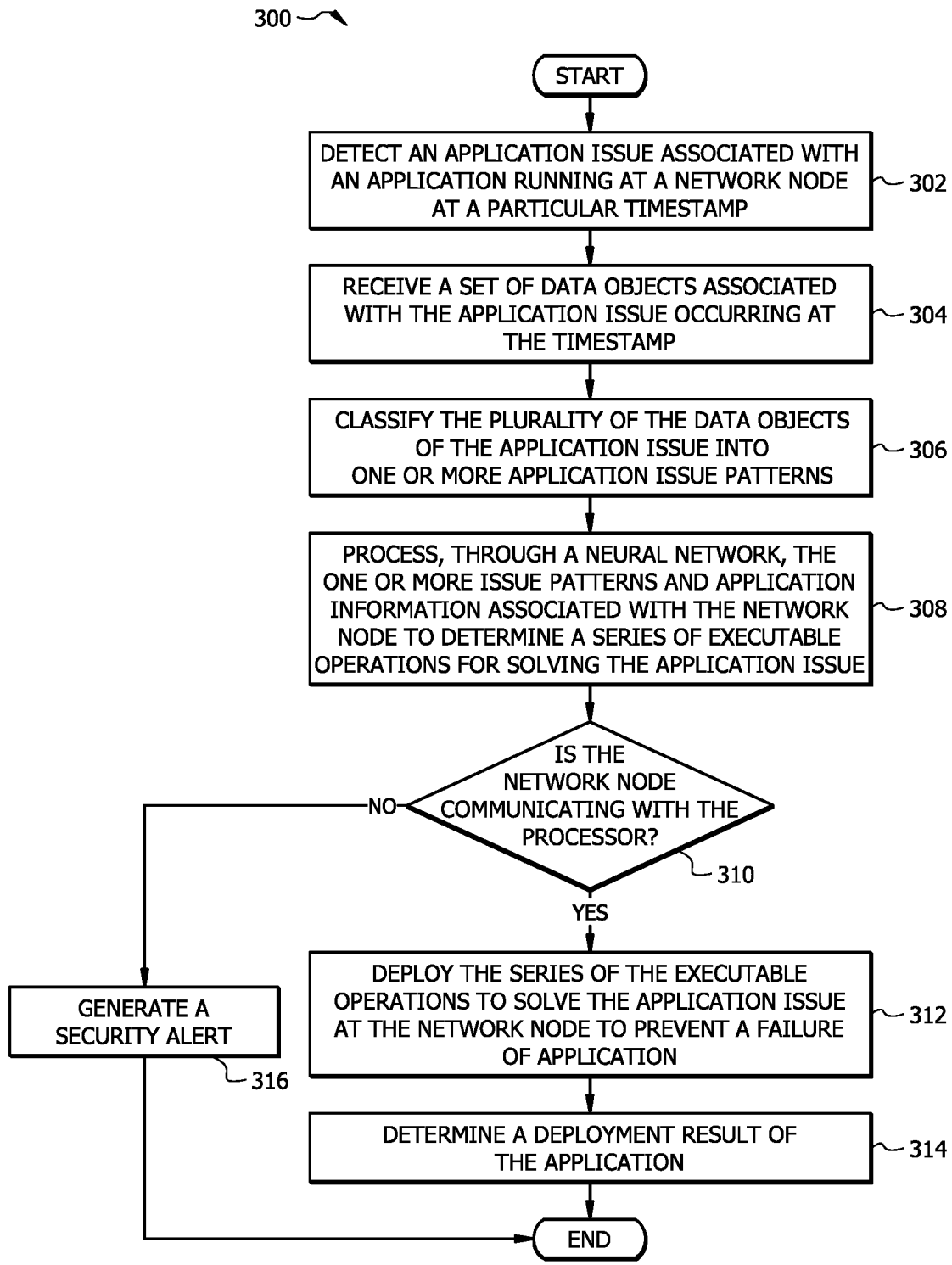
FIG. 3 illustrates an example operational flow of a method for auto-determining solutions to solve dynamic issues in a distributed network.

Example Operational Flow for Auto-Determining Solutions for Dynamitic Issues in a Distributed Network FIG. 3 illustrates an example flow of a method 300 for auto-determining solutions for dynamitic issues in a distributed network in the system 100. Modifications, additions, or omissions may be made to method 300. Method 300 may include more, fewer, or other operations. For example, operations may be performed by the central server 130 in parallel or in any suitable order. While at times discussed as the system 100, processor 132, operation engine 134, sense module 154, strategy module 158, action module 162, or components of any of thereof performing operations, any suitable system or components of the system 100 may perform one or more operations of the method 300. For example, one or more operations of method 300 may be implemented, at least in part, in the form of software instructions 150 of FIG. 1, stored on non-transitory, tangible, machine-readable media (e.g., memory 138 of FIG. 1) that when run by one or more processors (e.g., processor 132 of FIG. 1) may cause the one or more processors to perform operations 302-316.

For example, when the software instructions 150 are executed, the central server 130 executes an operation engine 134 to perform operations in the method 300 illustrated in FIG. 3.

At operation 302, the central server 130 may detect an application issue 146 associated with an application 170 running at a network node 120 at a particular timestamp 186.

At operation 304, the central server 130 may receive a set of data objects 148 associated with the application issue 146.

At operation 306, the central server 130 may classify, by a machine learning model 156, the set of the data objects 148 of the application issue 146 into one or more issue patterns 174. In some embodiments, the machine learning model 156 is trained based on the plurality of sets of the previous data objects 181 and corresponding issue patterns 174 associated with the corresponding previous application issues 180.

At operation 308, the central server 130 may process, through a neural network 160, the one or more issue patterns 174 and application information associated with the application issue 146 at the network node 120 to determine a series of executable operations 178 for solving the application issue 146. In some embodiments, the neural network 160 is trained based on the plurality of the issue patterns 174 and associations between the issue patterns 174 and the plurality of series of the executable operations 178.

At operation 310, the central server 130 may determine whether the network node 120 is communicating with the processor 132.

At operation 312, the central server 130 may deploy the series of the executable operations 178 to the network node 120 in response to determining that the network node 120 is communicating with the processor 132. The series of the executable operations 178 is configured to be automatically executed at the network node 120 to solve the application issue 146. The central server 130 may deploy the series of the executable operations 178 to solve the application issue 146 at the network node 120 to prevent a failure operation of the application 170.

At operation 314, the central server 130 may determine a deployment result of the application 170. The central server 130 may continuously receive the operation data of the application 170 running at the network node 120. The central server 130 may identify operation changes associated with the application issue 146. For example, the central server 130 may determine a deployment result of the application 170 which indicates that the application issue 146 is solved at the network node 120.

At operation 316, the central server 130 may generate a security alert with an operation status of the network node 120 for further testing the network node 120 in response to determining that the network node 120 is not communicating with the processor 132 or the network node 120 is not communicating with the processor 132.

Figure 4:
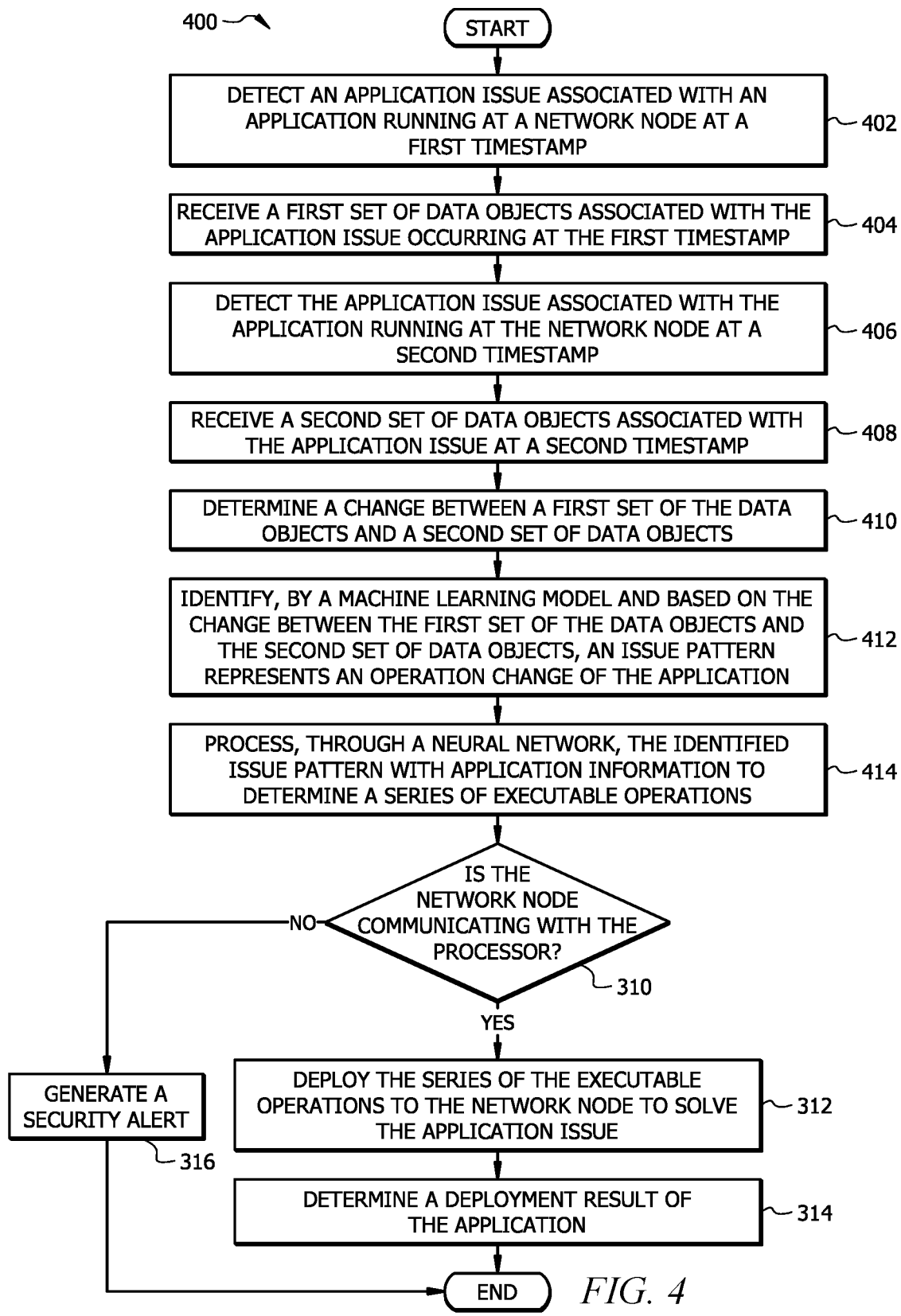
FIG. 4 illustrates an example operational flow of a method for auto-detecting dynamic issue changes to solve dynamic issues in a distributed network.

Example Operational Flow for Auto-Detecting Dynamic Issue Changes in a Distributed Network FIG. 4 illustrates an example backend operational flow of a method 400 to auto-detecting dynamic issue changes in a distributed network. Modifications, additions, or omissions may be made to method 400. Method 400 may include more, fewer, or other operations. For example, operations may be performed by the central server 130 in parallel or in any suitable order. While at times discussed as the system 100, processor 132, operation engine 134, sense module 154, strategy module 158, action module 162, and other program modules which are implemented in computer-executable software instructions, such as software instructions 150, or components of any of thereof performing operations, any suitable system or components of the system may perform one or more operations of the method 400. For example, one or more operations of method 400 may be implemented, at least in part, in the form of software instructions 150 of FIG. 1, stored on non-transitory, tangible, machine-readable media (e.g., memory 138 of FIG. 1) that when run by one or more processors (e.g., processor 132 of FIG. 1) may cause the one or more processors to perform operations 402-414 and 310-316.

At operation 402, the central server 130 may detect an application issue 146 associated with an application 170 running at a network node 120 at a first timestamp 186.

At operation 404, the central server 130 may receive a first set of data objects associated with the application issue 146 occurring at the first timestamp 186.

At operation 406, the central server 130 may detect the application issue 146 associated with the application 170 running at the network node 120 at a second timestamp 186.

At operation 408, the central server 130 may receive a second set of data objects associated with the application issue 146 occurring at the second timestamp 186.

At operation 410, the central server 130 may determine a change between a first set of the data objects and a second set of data objects.

At operation 412, the central server 130 may identify, by a machine learning model 156 and based on the change between the first set of the data objects and the second set of data objects, an issue pattern 174 represents an operation change of the application 170. The operation change of the application 170 occurs between the first timestamp 186 and the second timestamp 186. For example, the change between a first set of the data objects and a second set of data objects may represent the change associated with the memory utilization information of the application issue 146 occurring at the network node 120. For example, the memory utilization of the application 170 may be increased (e.g., from 60% to 70%) at the network node 120 at different timestamps 186. may be executed by the processor 132 to generate one or more updated issue patterns 174 dynamically in real time. The central server 130 may identify one or more issue patterns 174 for the application issue 146 by the machine learning model 156 and based on the change of the memory utilization of the application 170.

In some embodiments, the machine learning model 156 is trained based on the plurality of sets of the previous data objects 181 and corresponding issue patterns 174 associated with the corresponding previous application issues 180. The plurality of sets of the previous data objects 181 comprise a plurality of operation changes associated with the corresponding applications 170.

At operation 414, the central server 130 may user a neural network 160 to process the issue pattern 174 with application information to determine a series of executable operations 178 associated with the application issue 146. The series of the executable operations 178 is indicative of a solution of the application issue 146 and corresponds to the change of the operation status of the application 170. For example, the central server 130 may determine a series of executable operations 178 configured to increase the memory space by 10% to prevent a failure operation of application 170 at the network node 120.

At operation 310, the central server 130 may determine whether the network node 120 is communicating with the processor 132.

At operation 312, the central server 130 may deploy the series of the executable operations 178 to the network node 120 in response to determining that the network node 120 is communicating with the processor 132. The series of the executable operations 178 is configured to be automatically executed at the network node 120 to solve the application issue 146. The central server 130 may deploy the series of the executable operations 178 for solving the application issue 146 at the network node 120 to prevent a failure operation of the application 170. For example, For example, the central server 130 may deploy the series of the executable operations 178 to the network node 120 to increase the memory space by 10% to prevent a failure operation of application 170.

At operation 314, the central server 130 may determine a deployment result of the application 170. The central server 130 may continuously receive the operation data of the application 170 running at the network node 120. The central server 130 may identify operation changes associated with the application issue 146. For example, the central server 130 may determine a deployment result of the application 170 which indicates that the application issue 146 is solved at the network node 120.

At operation 316, the central server 130 may generate a security alert with an operation status of the network node 120 for further testing the network node 120 in response to determining that the network node 120 is not communicating with the processor 132 or the network node 120 is not communicating with the processor 132.

Figure 5:
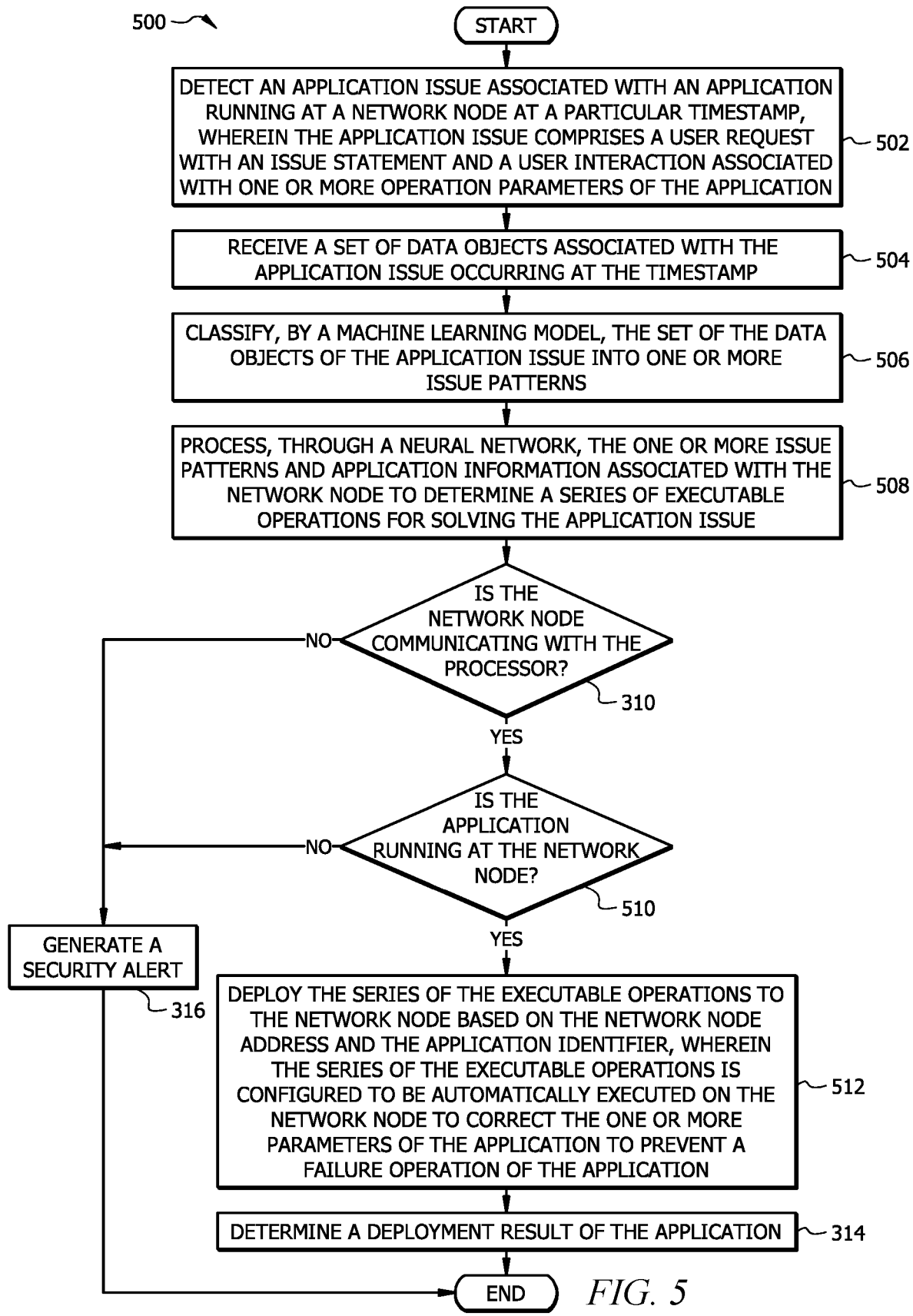
FIG. 5 illustrates an example operational flow of a method for implementing auto-correction to solve dynamic issues in a distributed network.

Example Operational Flow for Implementing Auto-Correction to Solve Dynamic Issues in a Distributed Network FIG. 5 illustrates an example backend operational flow of a method 500 to implement auto-correction to solve dynamic issues in a distributed network. Modifications, additions, or omissions may be made to method 500. Method 500 may include more, fewer, or other operations. For example, operations may be performed by the central server 130 in parallel or in any suitable order. While at times discussed as the system 100, processor 132, operation engine 134, sense module 154, strategy module 158, action module 162, or components of any of thereof performing operations, any suitable system or components of the system may perform one or more operations of the method 300. For example, one or more operations of method 500 may be implemented, at least in part, in the form of software instructions 150 of FIG. 1, stored on non-transitory, tangible, machine-readable media (e.g., memory 138 of FIG. 1) that when run by one or more processors (e.g., processor 132 of FIG. 1) may cause the one or more processors to perform operations 502-512, 310, and 314-316.

At operation 502, the central server 130 may detect an application issue 146 associated with an application 170 running at a network node 120 at a particular timestamp 186. The application issue 146 comprises a user request 124 with an issue statement 164 and a user interaction associated with one or more operation parameters of the application 170. For example, the central server 130 may receive the user request 124 with an issue statement 164 about a data access conflict issue associated with a file associated with an application 170. The issue statement 164 may include user inputs, user interactions with the file, and issue description, and any other data associated with the application issue 146.

At operation 504, the central server 130 may receive a set of data objects 148 associated with the application issue 146 occurring at the timestamp 186. The set of data objects 148 may represent the user request 124 and the issue statement 164 associated with the application 170 and the corresponding application issue 146.

At operation 506, the central server 130 may a machine learning model 156 to classify the set of the data objects of the application issue 146 into one or more issue patterns 174. The machine learning model 156 is trained based on the plurality of sets of the data objects and the issue patterns 174 associated with the corresponding previous application issues 180.

At operation 508, the central server 130 may use a neural network 160 to process the one or more issue patterns 174 and application information associated with the application issue 146 at the network node 120 to determine a series of executable operations 178. The a series of executable operations 178 is configured to solve the application issue 146. In some embodiments, the series of the executable operations 178 may be configured to be automatically executed at the network node 120 to correct the one or more parameters of the application 170 to prevent a failure operation of the application 170. In some embodiments, the operation status of the application 170 comprises one or more operation parameters associated with CPU utilization, memory utilization, memory boundary, signals from and sent to corresponding network nodes, user activities of accessing the application 170, network node address 176, network node status, or a certain time of period. In some embodiments, the one or more operation parameters associated with the application 170 may be configured to change an operation status of the application 170 running at the network node 120. For example, the series of the executable operations 178 is configured to correct one or more operation parameters of the application 170 to automatically unlocking some objects of the file and allow the user to access the corresponding objects of the file.

In some embodiments, the neural network 160 is trained based on the plurality of the issue patterns 174 and associations between the issue patterns 174 and the plurality of series of the executable operations 178. The series of executable operations 178 comprises a network node 120 address and an application identifier 172.

At operation 310, the central server 130 may determine whether the network node 120 is communicating with the processor 132.

At operation 510, the central server 130 may determine whether the application 170 is currently running at the network node 120 in response to determining that the network node 120 is communicating with the processor 132.

At operation 512, the central server 130 may deploy the series of the executable operations 178 to the network node 120 based at the network node 120 address and the application identifier 172 in response to determining that the application 170 is currently running at the network node 120 and the network node 120 is communicating with the processor 132. For example, the central server 130 may deploy the series of the executable operations 178 to the network node 120 to automatically unlocking some objects of the file and allow the user to access the corresponding objects of the file.

At operation 314, the central server 130 may determine a deployment result of the application 170. The central server 130 may continuously receive the operation data of the application 170 running at the network node 120. The central server 130 may identify operation changes associated with the application issue 146. For example, the central server 130 may determine a deployment result of the application 170 which indicates that the application issue 146 is solved at the network node 120.

At operation 316, the central server 130 may generate a security alert with an operation status of the network node 120 for further testing the network node 120 in response to determining that the network node 120 is not communicating with the processor 132 or the network node 120 is not communicating with the processor 132.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system comprising:
   a memory operable to store:
      a plurality of sets of previous data objects associated with corresponding previous application issues and issue patterns associated with corresponding applications, wherein each data object represents an operation status of a corresponding application, wherein each issue pattern represents one or more recurring operation status of the corresponding application, and
      a plurality of series of executable operations associated with the corresponding issue patterns configured to solve the previous application issues; and
   a processor operably coupled to the memory, the processor configured to:
      detect an application issue associated with an application running at a network node at a first timestamp;
      receive a first set of data objects associated with the application issue occurring at the first timestamp;
      detect the application issue associated with the application running at the network node at a second timestamp;
      receive a second set of data objects associated with the application issue occurring at the second timestamp;
      determine one or more operation changes between a first set of the data objects and a second set of data objects;
      identify, by a machine learning model and based on the one or more operation changes between the first set of the data objects and the second set of data objects a cluster of issue patterns representing the one or more operation changes of the application which occurs between the first timestamp and the second timestamp, wherein each issue pattern in the cluster is associated with a unique strategic solution with a series of executable operations, wherein the machine learning model is trained based on the plurality of sets of previous data objects and corresponding issue patterns associated with the corresponding previous application issues, and wherein the plurality of sets of previous data objects comprises a plurality of operation changes associated with the corresponding application issues;
      process, through a neural network, the issue pattern with application information to determine a series of executable operations associated with the application issue, wherein the series of the executable operations is indicative of a solution of the application issue and corresponds to the one or more operation changes of the operation status of the application; and
      deploy the series of the executable operations to the application running at the network node to solve the application issue to prevent a failure operation of the application.

2. The system of claim 1, wherein the plurality of sets of previous data objects and the previous application issues are associated with corresponding executable operations for the same application running on different network nodes in a distributed network, and
   wherein the plurality of sets of previous data objects and the previous application issues are associated with the corresponding applications operating on the same network node in the distributed network.

3. The system of claim 2, wherein the processor is further configured to: identify a plurality of issue patterns from the plurality of sets of previous data objects by classifying the plurality of sets of previous data objects; and determine associations between the issue patterns and corresponding executable operations for solving the previous application issues, and wherein the plurality of sets of the previous data objects comprise vector representations of the plurality of the operation changes associated with the application issues.

4. The system of claim 1, wherein the processor is further configured to:
   train the neural network based on the issue patterns and the associations between the issue patterns and the plurality of series of the executable operations;
   determine, by the neural network, a solution identifier for each series of executable operations associated with a corresponding application issue; and
   associate the corresponding solution identifier with an issue pattern and the corresponding application issue.

5. The system of claim 1, wherein the processor is further configured to:
   determine whether the network node is communicating with the processor;
   in response to determining that the network node is communicating with the processor, deploy the series of the executable operations to the network node to solve the application issue to prevent a failure operation of the application; and
   determine a deployment result of the application.

6. The system of claim 1, wherein the series of the executable operations comprises one or more of:
   a solution identifier,
   an issue pattern identifier,
   an issue identifier indicative of the application issue,
   an application identifier,
   a network node identifier indicative of a network node address,
   a current status of the application associated with the application issue, or
   a set of executable instructions for solving the application issue.

7. The system of claim 1, wherein the one or more operation changes comprises at least an increase in memory utilization of the application running at the network node between the first timestamp and the second timestamp;
   wherein the application information comprises at least a memory boundary for the application to run properly at the network node, wherein if the memory boundary is exceeded then the failure operation occurs at the application in the network node; and
   wherein deploying the series of executable operations comprises at least increasing a memory space of the network node such that the memory boundary is not exceed to prevent the failure operation of the application.

8. A method comprising:
   detecting an application issue associated with an application running at a network node at a first timestamp;
   receiving a first set of data objects associated with the application issue occurring at the first timestamp;
   detecting the application issue associated with the application running at the network node at a second timestamp;
   receiving a second set of data objects associated with the application issue occurring at the second timestamp;
   determining one or more operation changes between a first set of the data objects and a second set of data objects;
   identifying, by a machine learning model and based on the one or more operation changes between the first set of the data objects and the second set of data objects, a cluster of issue patterns represents the one or more operation changes of the application which occurs between the first timestamp and the second timestamp, wherein each issue pattern in the cluster is associated with a unique strategic solution with a series of executable operations, wherein the machine learning model is trained based on a plurality of sets of previous data objects and corresponding issue patterns associated with the corresponding previous application issues, and wherein the plurality of sets of previous data objects comprises a plurality of operation changes associated with the previous application issues;
   processing, through a neural network, the issue pattern with application information to determine a series of executable operations associated with the application issue, wherein the series of the executable operations is indicative of a solution of the application issue and corresponds to the operation change of the operation status of the application; and
   deploying the series of the executable operations to the application running at the network node to solve the application issue to prevent a failure operation of the application.

9. The method of claim 8, wherein the plurality of sets of previous data objects and the previous application issues are associated with corresponding executable operations for the same application running on different network nodes in a distributed network, and
   wherein the plurality of sets of previous data objects and the previous application issues are associated with the corresponding applications operating on the same network node in the distributed network.

10. The method of claim 9, further comprising:
    identifying a plurality of issue patterns from the plurality of sets of previous data objects by classifying the plurality of sets of previous data objects; and
    determining associations between the issue patterns and corresponding executable operations for solving the previous application issues, and
    wherein the plurality of sets of previous data objects comprise vector representations of the plurality of the operation changes associated with the previous application issues.

11. The method of claim 10, wherein the application information comprises textual data of an operation status of the application, and wherein the operation status of the application comprises one or more operation changes associated with one or more measurable features of CPU utilization, memory capacity, memory utilization, memory boundary, data accessibility associated with the application, network node address, network node status, input data, output data, or an application issue statement received from a user.

12. The method of claim 11, further comprising:
    training the neural network based on the issue patterns and the associations between the issue patterns and the plurality of series of the executable operations;
    determining, by the neural network, a solution identifier for each series of executable operations associated with a corresponding application issue; and
    associating the corresponding solution identifier with an issue pattern and the corresponding application issue.

13. The method of claim 8, further comprising: determining whether the network node is communicating with a processor; in response to determining that the network node is communicating with the processor, deploying the series of the executable operations to the network node to solve the application issue to prevent a failure operation of the application; and determining a deployment result of the application.

14. The method of claim 8, wherein the series of the executable operations comprises one or more of:
    a solution identifier,
    an issue pattern identifier,
    an issue identifier indicative of the application issue,
    an application identifier,
    a network node identifier indicative of a network node address,
    a current status of the application associated with the application issue, or
    a set of executable instructions for solving the application issue.

15. A non-transitory computer-readable medium storing instructions that when executed by a processor cause the processor to:
- detect an application issue associated with an application running at a network node at a first timestamp;
- receive a first set of data objects associated with the application issue occurring at the first timestamp;
- detect the application issue associated with the application running at the network node at a second timestamp;
- receive a second set of data objects associated with the application issue occurring at the second timestamp;
- determine one or more operation changes between a first set of the data objects and a second set of data objects;
- identify, by a machine learning model and based on the one or more operation changes between the first set of the data objects and the second set of data objects, a cluster of issue patterns representing one or more operation changes of the application which occurs between the first timestamp and the second timestamp, wherein each issue pattern in the cluster is associated with a unique strategic solution with a series of executable operations, wherein the machine learning model is trained based on a plurality of sets of previous data objects and corresponding issue patterns associated with the corresponding previous application issues, and wherein the plurality of sets of previous data objects comprises a plurality of operation changes associated with the previous application issues;
- process, through a neural network, the issue pattern with application information to determine a series of executable operations associated with the application issue, wherein the series of the executable operations is indicative of a solution of the application issue and corresponds to the operation change of a operation status of the application; and
- deploy the series of the executable operations to the application running at the network node to solve the application issue to prevent a failure operation of the application.

16. The non-transitory computer-readable medium of claim 15, wherein the plurality of sets of previous data objects and the previous application issues are associated with corresponding executable operations for the same application running on different network nodes in a distributed network, and
wherein the plurality of sets of previous data objects and the previous application issues are associated with the corresponding applications operating on the same network node in the distributed network.

17. The non-transitory computer-readable medium of claim 16, wherein the instructions further cause the processor to:
- identify a plurality of issue patterns from the plurality of sets of previous data objects by classifying the plurality of sets of the data objects; and
- determine associations between the issue patterns and corresponding executable operations for solving the previous application issues, and
wherein the plurality of sets of previous data objects comprise vector representations of the plurality of the operation changes associated with the previous application issues.

18. The non-transitory computer-readable medium of claim 15, wherein the application information comprises textual data of an operation status of the application, and wherein the operation status of the application comprises one or more operation changes associated with one or more measurable features of CPU utilization, memory capacity, memory utilization, memory boundary, data accessibility associated with the application, network node address, network node status, input data, output data, or an application issue statement received from a user.

19. The non-transitory computer-readable medium of claim 15, wherein the instructions further cause the processor to:
- train the neural network based on the issue patterns and the associations between the issue patterns and the plurality of series of the executable operations;
- determine, by the neural network, a solution identifier for each series of executable operations associated with a corresponding application issue; and
- associate the corresponding solution identifier with an issue pattern and the corresponding application issue.

20. The non-transitory computer-readable medium of claim 15, wherein the instructions further cause the processor to:
- determine whether the network node is communicating with the processor;
- in response to determining that the network node is communicating with the processor, deploy the series of the executable operations to the network node to solve the application issue to prevent a failure operation of the application; and
- determine a deployment result of the application, and
wherein the series of the executable operations comprises one or more of:
- a solution identifier,
- an issue pattern identifier,
- an issue identifier indicative of the application issue,
- an application identifier,
- a network node identifier indicative of a network node address,
- a current status of the application associated with the application issue, or
- a set of executable instructions for solving the application issue.

* * * * *

UNITED STATES PATENT AND TRADEMARK OFFICE
CERTIFICATE OF CORRECTION

| | |
|---|---|
| PATENT NO. | : 12,222,801 B2 |
| APPLICATION NO. | : 18/163791 |
| DATED | : February 11, 2025 |
| INVENTOR(S) | : Madiya et al. |

It is certified that error appears in the above-identified patent and that said Letters Patent is hereby corrected as shown below:

On the Title Page

Under Inventors item (72), Line 1, please delete, "Tirupathirao Madiya" and please insert -- Tirupathi Rao Madiya --, therefor.

Signed and Sealed this
Nineteenth Day of August, 2025

Coke Morgan Stewart
*Acting Director of the United States Patent and Trademark Office*